July 9, 1963 R. G. DURNAL 3,097,357
AIRCRAFT POSITION DETERMINING APPARATUS
Filed Jan. 11, 1961

WITNESSES:
Bernard R. Gieguey
James F. Young

INVENTOR
Robert G. Durnal
BY
ATTORNEY

United States Patent Office 3,097,357
Patented July 9, 1963

3,097,357
AIRCRAFT POSITION DETERMINING
APPARATUS
Robert G. Durnal, Catonsville, Md., assignor to Westinghouse Electric Corporation, East Pittsburgh, Pa., a corporation of Pennsylvania
Filed Jan. 11, 1961, Ser. No. 82,021
2 Claims. (Cl. 343—112)

The present invention relates to aircraft position determining apparatus, and more particularly to aircraft position determining apparatus to be used to maintain an aircraft about a predetermined holding point.

The presently well known TACAN or VORTAC navigational systems transmit range and bearing information to allow suitably equipped aircraft to determine their range and bearing with respect to the TACAN or VORTAC transmitting station. It is often required that an aircraft fly a pre-established course about a predetermined holding point at some distance from the transmitting station. For example, during peak traffic at an airport, aircraft may be required to hold at various points on route until traffic is relieved at the airport. With only range and bearing information of the craft's position with respect to the station being utilized, it is difficult to maintain the aircraft about the holding point, especially under inclement weather conditions.

It is therefore an object of the present invention to provide an improved method of allowing a craft to hold its position about a predetermined holding point with respect to a range and bearing information transmitting source.

It is a further object of the present invention to provide improved position determining apparatus to allow a craft to hold its position about a predetermined holding point with respect to a bearing and range transmitting source.

It is a further object of the present invention to provide craft position determining apparatus incorporated within a TACAN or VORTAC navigational system to allow a suitably equipped craft to hold its position by display or control apparatus on the craft about a predetermined holding point with respect to the TACAN or VORTAC transmitter.

Figure 1:
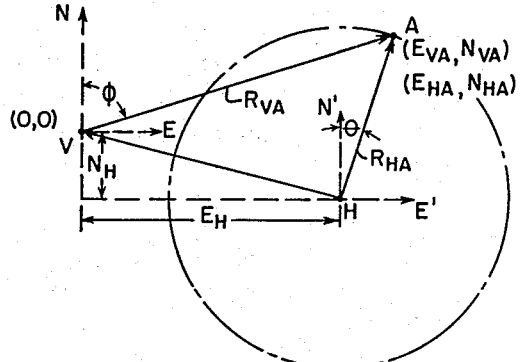
Figure 2:
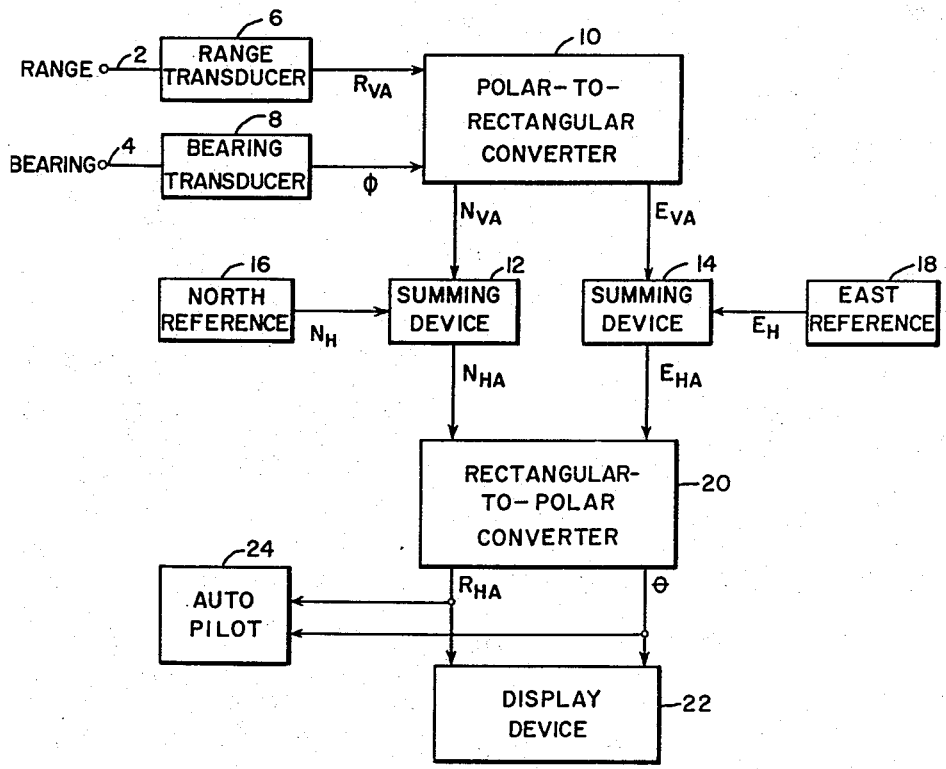

Further objects and improvements will become apparent from the following description and drawings, in which:

FIGURE 1 is a distance vector diagram showing the distance relationships between an information transmitting source, a craft and a predetermined holding point; and, FIGURE 2 is a block diagram of craft position determining apparatus in accordance with the present invention.

The craft position determining apparatus described herein is to be used in conjunction with a TACAN or VORTAC navigational system. In such systems, range and bearing information is transmitted from a fixed station on the ground to a suitably equipped aircraft in flight. The range information is provided from transponder type distance measuring equipment (DME) by the aircraft transmitting an interrogating signal, which when received by the station causes a coded signal to be transmitted from the station. The time difference between transmission of the interrogator signal and the receipt of the responder signal from the transmitting station is then a measure of the distance between the craft and the transmitting station. The bearing information of the craft's position with respect to the transmitting station is obtained by phase comparison of a received bearing coded signal from the station with respect to a known direction coded signal, generally a North bearing signal.

Since both the transmitting and receiving apparatus of TACAN or VORTAC navigational systems are well known in the art, no further description will be included herein.

Referring to FIG. 1, a distance vector diagram is shown, wherein point V represents the location of a range and bearing information transmitting source, point A represents the instantaneous position of a craft equipped with suitable range and bearing information receiving equipment and point H is the position of a predetermined holding point around which it is desired to maintain the craft. Taking point V as the origin (O, O) for a Cartesian coordinate system (N-E), the North N direction and East E direction are so defined. The distance vector $\overline{VA}$ is defined between points A and V having the magnitude $R_{VA}$ at an angle $\phi$ with respect to the North N direction. Point A has the rectangular coordinates with respect to the origin V of the N-E reference of $E_{VA}$, $N_{VA}$. The vector $\overline{HV}$ is between points H and V. A transferred Cartesian coordinate system (N'-E') is defined with its origin at point H by the North N' and the East E' directions. The craft position A then has the coordinates $E_{HA}$, $N_{HA}$, with respect to the transferred coordinate system at H (N'-E'). The resultant vector $\overline{HA}$ is obtained by vectorially adding the vector $\overline{VA}$ to the vector $\overline{HV}$. The vector $\overline{HA}$ is shown as having a magnitude $R_{HA}$ at an angle $\theta$ with respect to the N' direction. The distances $N_H$ and $E_H$ show the transfer distances from the original origin V of the rectangular coordinate system (N-E) to the transfer rectangular coordinate system (N'-E') at H.

FIG. 2 shows a block diagram of the position determining apparatus to be carried aboard a craft instantaneously positioned at point A of FIG. 1. Range and bearing information received from the transmitting source of a TACAN or VORTAC navigational system are applied to input terminals 2 and 4. The range information is applied through the terminal 2 to the range transducer 6 which provides an output signal $R_{VA}$ which is indicative of the range between point V and point A. The bearing information is applied through the terminal 4 to the bearing transducer 8, which provides an output signal $\phi$ which is indicative of the angle between the vector $\overline{VA}$ and the North direction N. The signals $R_{VA}$ and $\phi$ are the polar coordinates of point A with respect to point V. These signals may either be shaft positions or analog voltages. The polar to rectangular converter 10 receives the polar signals $R_{VA}$ and $\phi$, and converts them into the rectangular coordinate signals $E_{VA}$ and $N_{VA}$ of the point A with respect to point V. The polar to rectangular converter 10 may for example be a resolver which would receive shaft rotation inputs $R_{VA}$ and $\phi$, and multiply $R_{VA}$ by the cosine and sine of the angle $\phi$ to provide the rectangular coordinate output signals $E_{VA}$ and $N_{VA}$ respectively. If a resolver were used, rectangular output signals provided would be in analog voltage form. The summing devices 12 and 14 receive the rectangular coordinate signals $N_{VA}$ and $E_{VA}$, respectively. A North reference 16 is provided to provide a reference signal $N_H$ to the summing device 12. The output signal $N_{HA}$ of the summing device 12 is the algebraic sum of the signals $N_{VA}$ and $N_H$. An East reference 18 is provided to supply a reference signal $E_H$ to the summing device 14. The output signal $E_{HA}$ of the summing device 14 is the algebraic sum of the signals $E_{VA}$ and $E_H$. The North and East references may, for example, be potentiometers that are tapped to provide the reference signal outputs $N_H$ and $E_H$. The summing devices 12 and 14 may, for example, be resistive networks whose output is the algebraic sum of its inputs. The rectangular to polar converter 20 receives the signals $N_{HA}$ and $E_{HA}$ and converts the signals into the polar signals $R_{HA}$ and $\theta$ which are the polar coordinates of point A with respect to the holding point H. The display device 22 receives the polar signals $R_{HA}$ and $\theta$, and displays the vector $\overline{HA}$ so that the pilot of the craft at point A, by maintaining a heading perpendicular to the vector HA, will be able to maintain the plane about the holding point H. Similarly, by appropriate simple adjustments in the autopilot 24 the polar signals $R_{HA}$ and $\theta$ may be supplied to the latter for automatically directing the aircraft in a closed path around the holding point instead of directing the aircraft through the holding point. This change can be effected in a manner well known to those skilled in the art, by making an appropriate change of 90° in the normal relation between the autopilot's output and its null position. Also, instead of making the above mentioned adjustment in the autopilot, appropriate means may be provided for shifting the angle information by 90°. The rectangular to polar converter 20 and the display device 22 may for example be in a cathode ray tube structure, wherein the signals $N_{HA}$ and $E_{HA}$ are applied to the vertical and horizontal deflection plates so that the resulting display on the screen is the vector $\overline{HA}$.

The mode of operation of the position determining apparatus is in essence: To establish a signal indicative of the distance vector $\overline{VA}$ of the craft position A with respect to the bearing and range information transmitting source position V, to provide by reference means the distance reference vector $\overline{HV}$ of the holding point H with respect to the range and bearing information transmitting source position V; to take the vector sum of distance vectors $\overline{VA}$ and $\overline{HV}$ to provide the resultant distance vector $\overline{HA}$ of the craft position A with respect to the holding point H; and then to display the resultant vector $\overline{HA}$, i.e. the craft's position A with respect to the holding point H.

Considering the operation of the apparatus of FIG. 2, range and bearing information is applied to the range transducer 6 and to the bearing transducer 8 which converts this information into the polar coordinate outputs $R_{VA}$ and $\phi$, which are the polar coordinates of the craft's position A with respect to the origin of the rectangular coordinate system N-E. The polar coordinates $R_{VA}$ and $\phi$ are converted in the polar to rectangular converter 10 to the rectangular coordinates $E_{VA}$ and $N_{VA}$ of the craft's position at A with respect to point V by multiplying in the converter 10 the distance $R_{VA}$ between point A and point V, by the cosine and sine of the angle $\phi$, respectively. The summing devices 12 and 14 in cooperation with the North and East references 16 and 18 shift the rectangular coordinate reference N-E from point V, the location of the transmitting source, to point H, the holding reference point, establishing the rectangular coordinate system N'-E'. The summing device 12 receives the North rectangular coordinate $N_{VA}$ of point A with respect to V, and the North reference signal $N_H$, which is indicative of the distance between points H and V in the North direction. The output of the summing device 12 is thus the algebraic sum of $N_{VA}$ and $N_H$, and is designated as $N_{HA}$, indicative of the craft's position A with respect to the holding point reference system established at H. The summing device 14 receives the East rectangular coordinate signal $E_{VA}$ of point A with respect to transmitting source position V, and the East reference signal $E_H$, which is indicative of the distance between point H and point V, in the East direction, and provides an output signal $E_{HA}$, the algebraic sum of $E_{VA}$ and $E_H$. The signal $E_{HA}$ is the rectangular coordinate signal in the East direction of the craft's position A with respect to the holding point reference H. The rectangular coordinant signals $E_{HA}$ and $N_{HA}$ of the craft's position A with respect to the coordinant system N'-E' established at point H are applied to rectangular to polar coordinate converter 20 wherein the rectangular signals are converted into the polar coordinate $R_{HA}$ and $\theta$, which are the polar coordinates of the craft's position A with respect to the holding point H. The polar coordinant signals $R_{HA}$ and $\theta$ are displayed through display device 22, being indicative of the vector $\overline{HA}$, the distance vector between the craft at A and the holding point H. With the changes previously indicated polar coordinant signals $R_{HA}$ and $\theta$ are also supplied to the automatic pilot 24 to be used to provide control signals to maintain the craft position about the holding reference point H.

Although the present invention has been described with a certain degree of particularity, it is to be understood that the present disclosure has been made only by way of example and that numerous changes in the details of construction and the combination of arrangement of parts may be resorted to without departing from the scope and spirit of the present invention.

I claim as my invention:

1. A method of providing information from a source of signals having range and bearing information from one selected point usable in directing aircraft in a closed path around a second selected point comprising the steps of, transmitting from said one selected point range and bearing information, receiving said information and deriving electrical signals representing a vector indicating the position of said aircraft relative to said first point, deriving electrical signals representing a vector indicating the position of said second point relative to said first point, vectorially adding said vectors to provide a course vector indicating instantaneous position of said aircraft with respect to said second point and utilizing said course vector signals for directing said craft in a closed path around said second point.

2. A system for deriving range and bearing information from an information transmitting station at one selected point usable in directing aircraft in a closed path about a second selected point comprising, means for transmitting range and bearing information from said station, means in said aircraft responsive to signals from said transmitting station for deriving electrical signals representing a vector indicating the position of said aircraft relative to said station, means for deriving electrical signals representing a vector indicating the position of said second selected point with respect to said first point, means for combining said signals for vectorially adding said vectors to provide course vector signals representing a vector indicating the instantaneous position of said aircraft with respect to said second point and automatic means utilizing said course vector signals for directing said aircraft in a closed path around said second point.

References Cited in the file of this patent
UNITED STATES PATENTS

| | | |
|---|---|---|
| 2,599,889 | Biggs et al. | June 10, 1952 |
| 2,637,026 | Koehler | Apr. 28, 1953 |
| 2,804,613 | Haworth | Aug. 27, 1957 |
| 2,927,751 | Daspit | Mar. 8, 1960 |